Sept. 3, 1946.    G. O. CONNER    2,406,808
FORMING MACHINE
Filed Aug. 7, 1943    11 Sheets-Sheet 1

INVENTOR
Guy O. Conner

Sept. 3, 1946.  G. O. CONNER  2,406,808
FORMING MACHINE
Filed Aug. 7, 1943  11 Sheets-Sheet 3

INVENTOR
Guy O. Conner

Sept. 3, 1946.    G. O. CONNER    2,406,808
FORMING MACHINE
Filed Aug. 7, 1943    11 Sheets-Sheet 4

INVENTOR
Guy O. Conner

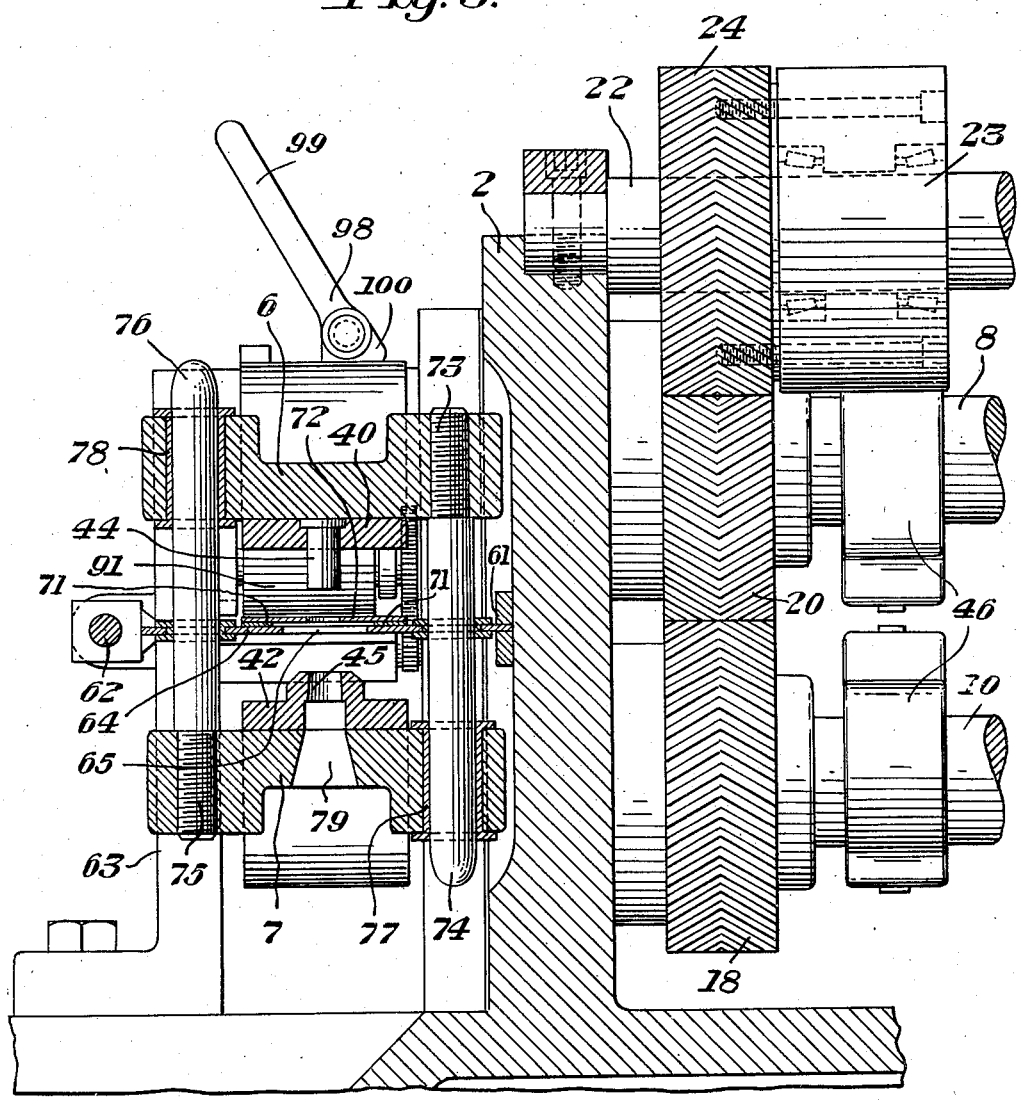

Sept. 3, 1946.  G. O. CONNER  2,406,808
FORMING MACHINE
Filed Aug. 7, 1943  11 Sheets-Sheet 6
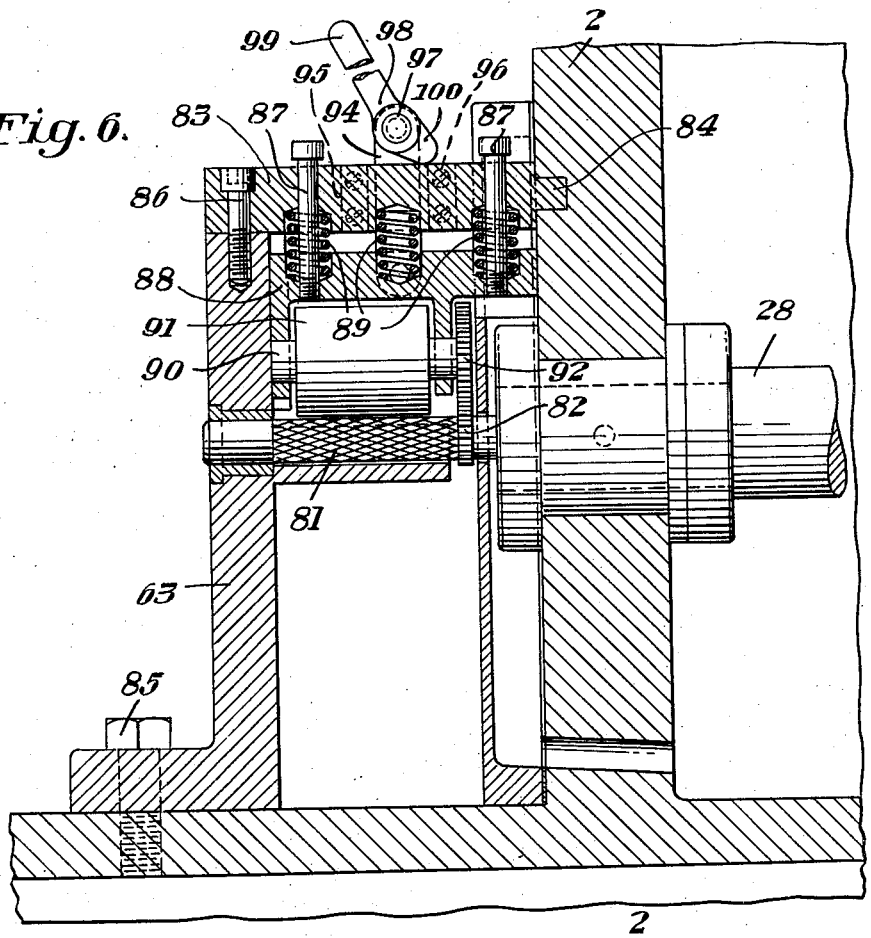
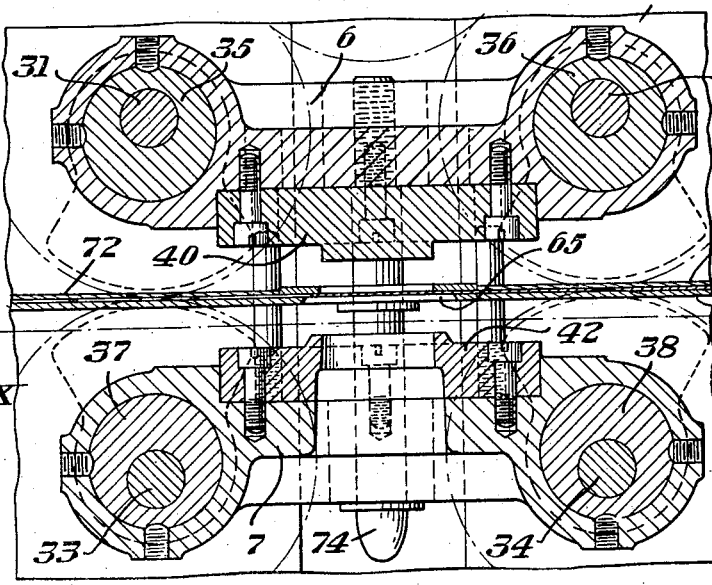
INVENTOR
Guy O. Conner Sept. 3, 1946.  G. O. CONNER  2,406,808
FORMING MACHINE
Filed Aug. 7, 1943   11 Sheets-Sheet 7
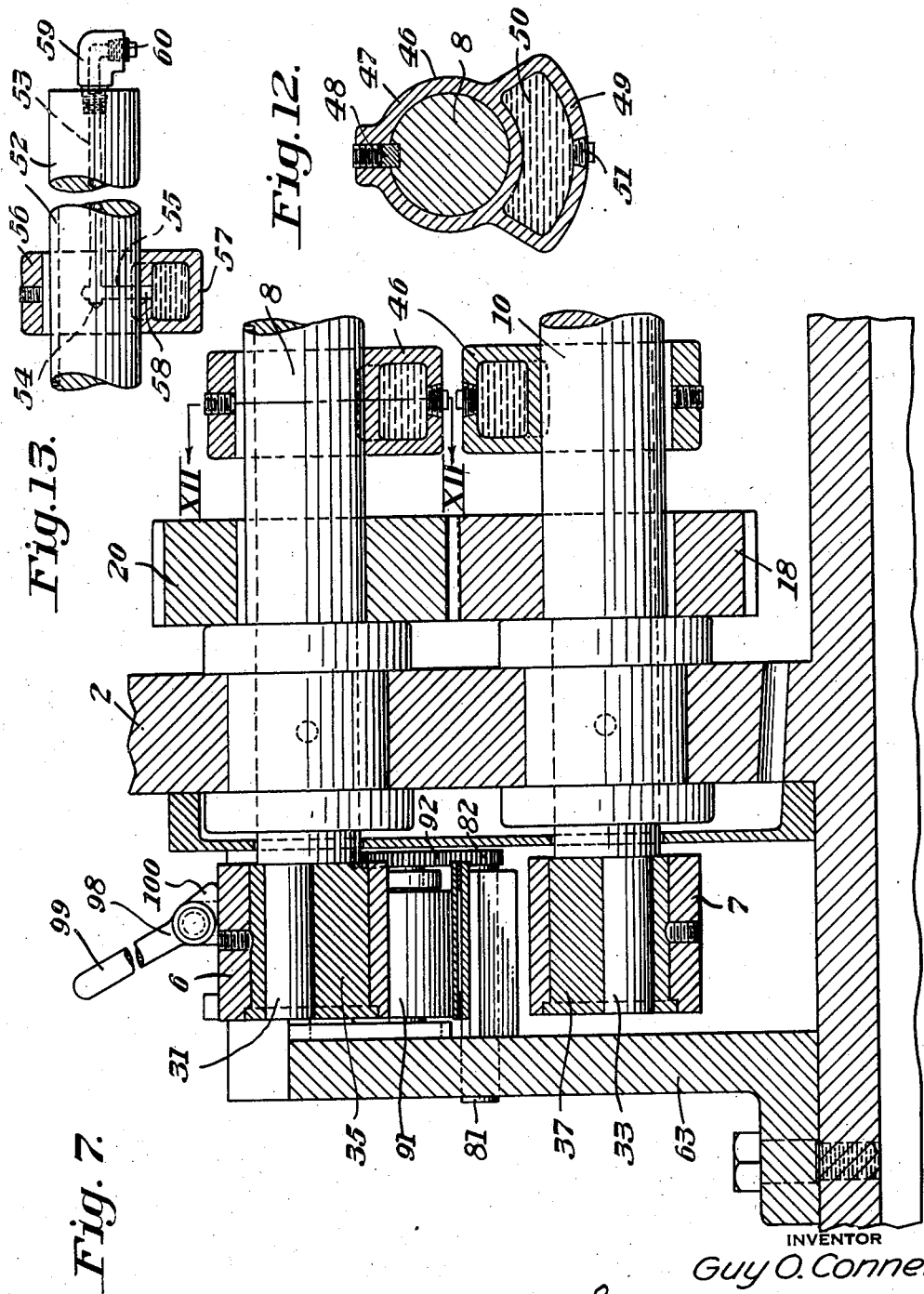
INVENTOR
Guy O. Conner

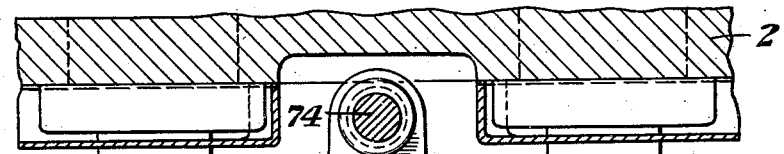
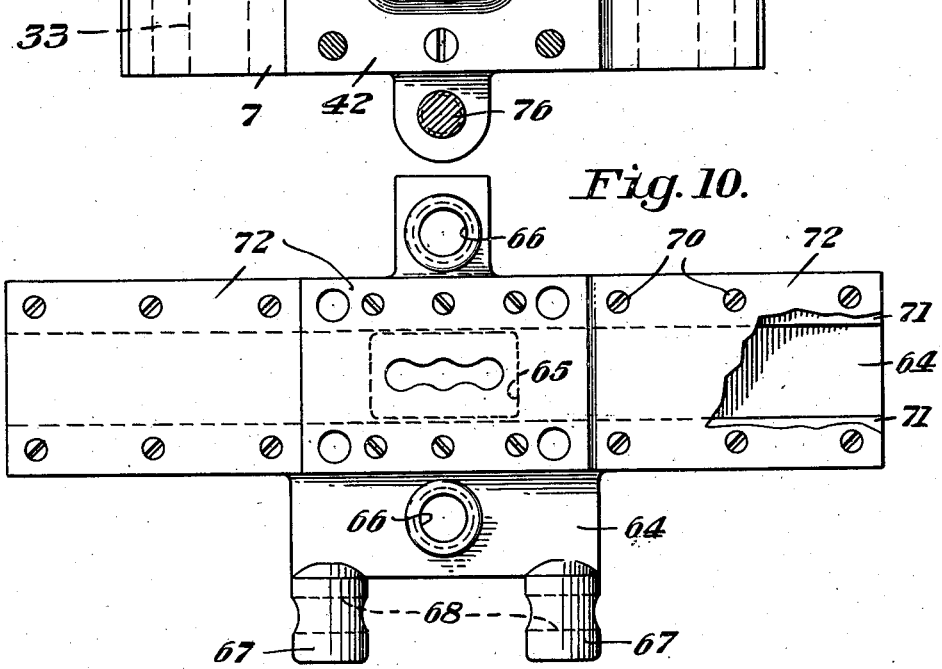
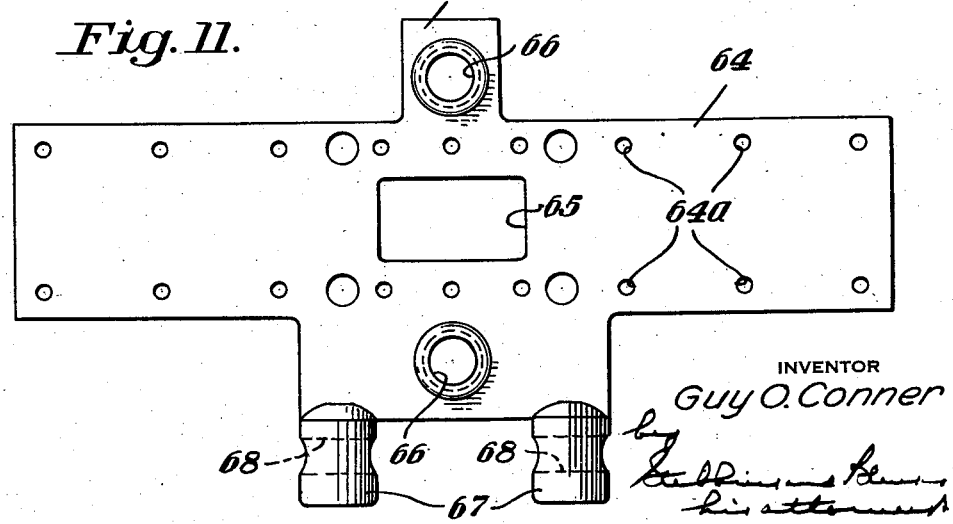

Sept. 3, 1946. G. O. CONNER 2,406,808
FORMING MACHINE
Filed Aug. 7, 1943   11 Sheets-Sheet 9
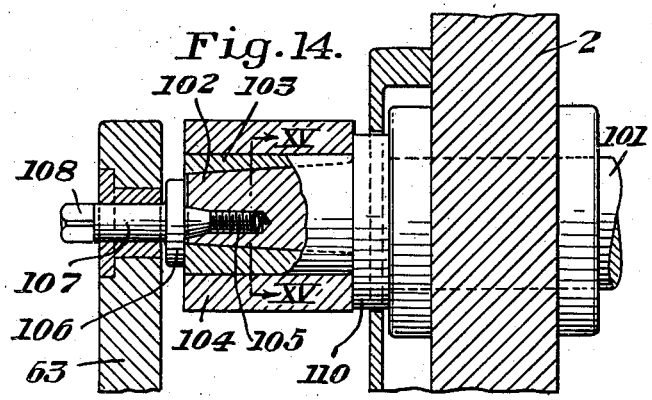
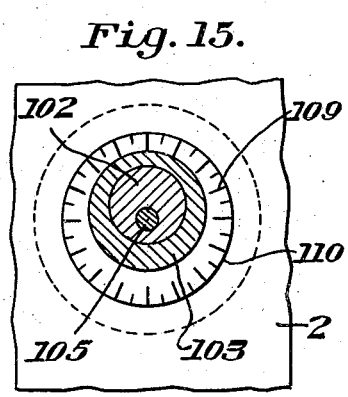
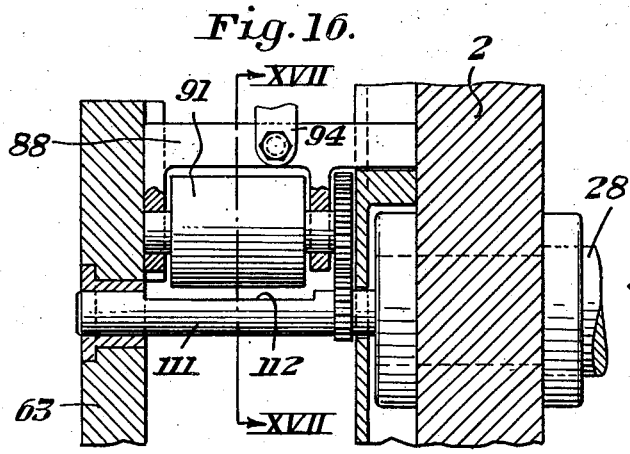
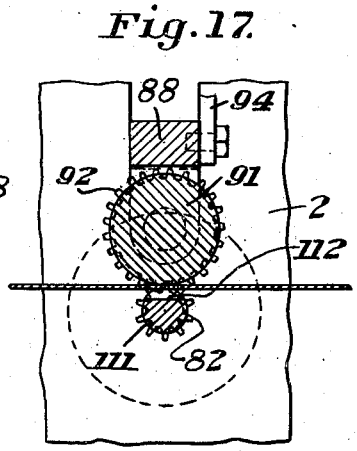
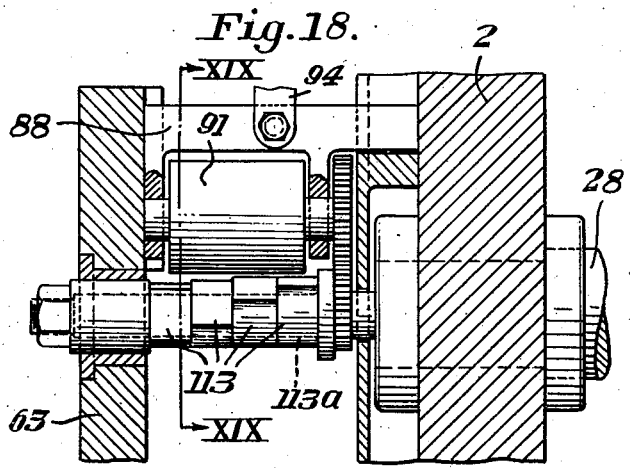
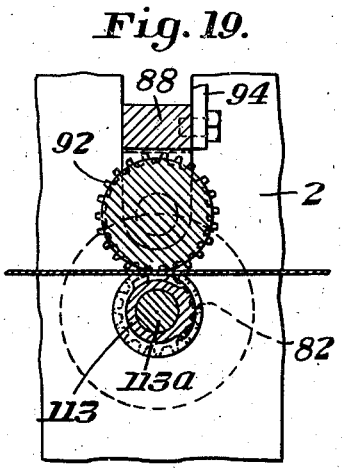
INVENTOR
Guy O. Conner Sept. 3, 1946.　　　　G. O. CONNER　　　　2,406,808
FORMING MACHINE
Filed Aug. 7, 1943　　　　11 Sheets-Sheet 10

INVENTOR
Guy O. Conner

Sept. 3, 1946.  G. O. CONNER  2,406,808
FORMING MACHINE
Filed Aug. 7, 1943  11 Sheets-Sheet 11

INVENTOR
Guy O. Conner
by
his attorneys

Patented Sept. 3, 1946

2,406,808

UNITED STATES PATENT OFFICE 2,406,808

FORMING MACHINE

Guy O. Conner, Wheeling, W. Va.

Application August 7, 1943, Serial No. 497,792

44 Claims. (Cl. 164—89)

This invention relates to forming machines, and particularly to forming machines for high speed operation. It relates more particularly to machines through which work is passed and which act on the work with rapid successive operations. The term "forming machine" is used herein as a term of definition and not of limitation; my invention is applicable to practically all operations which may be performed on work passed through the machine—examples are stamping, die forming, plastic molding, ceramic molding, extrusion, printing, etc.

Purely for the sake of explanation and illustration I shall describe the invention in connection with the stamping of metal strip, it being understood that operations other than stamping may be performed by use of the invention, that individual successively fed blanks may be operated upon instead of strip and that work of material other than metal may be processed by use of the invention.

In the metal working arts, and particularly in the metal stamping art, emphasis has for many years been placed upon so-called "high speed" of operation and efforts of those skilled in the art have been devoted to increasing production per unit of time. For example, in making small metal stampings out of strip, speeds of operation have increased somewhat over the years so that prior to the present invention and, indeed, now, except for the present invention, 500 strokes per minute has been and is deemed by those skilled in the art to be a very high speed. When attainment of higher speeds has been attempted it has not been possible to feed the work through the machine satisfactorily and other difficulties have been encountered, including excessive vibration and strains upon the machine parts and foundation bolts.

I have discovered that it is possible and how to perform operation such as above referred to at speeds not merely higher than the maximum speeds heretofore considered possible but at speeds of the order of multiples of the speeds heretofore considered possible; not only that, but I accomplish these results with a relatively light weight and easily constructed machine, considering its output and capacity. I can fabricate at speeds previously considered utterly impossible products which could not have been made at far lower speeds. In short, I have devised a forming machine having capabilities of quite different order from the capabilities of the best and fastest comparable machines heretofore known.

For example, in accordance with my invention I can make small metal stampings out of strip at speeds two, three and even more times the speeds heretofore considered maximum for making the same stampings out of the same strip. Where for particular stamping work 500 strokes per minute has heretofore been considered very high speed and virtually the highest attainable, I can produce the same stampings out of the same strip at speeds of the order of 1000 to 1500 or more strokes per minute.

I desirably employ in my forming machine opposed cooperating forming heads each mounted for generally rotary movement while being guided so as to maintain substantially fixed orientation, said heads during operation of the machine moving toward and away from each other. Preferably when the forming heads are closest together they move also laterally generally in the same direction. This motion broadly is not new and has previously been employed in stamping and similar machines. However, the means cooperating with the forming heads for moving the work through the machine and controlling it during the forming operation and during its passage through the machine have been such that when it has been attempted to increase the speed of operation of the heads the work has not been properly controlled and the machine has not functioned satisfactorily. Moreover, the question of vibration at what have heretofore been regarded as high speeds has been serious and has not been overcome prior to the present invention.

So far as the speed of operation of the heads themselves is concerned, I have found that this can be greatly increased by counterbalancing the heads in a manner presently to be explained; and I provide for changing the counterbalancing effect dependent upon such factors as the thickness of the stock being operated upon, the size of the stampings being produced, the character of the stock, etc.

Part of the problem has been to feed the stock through the machine fast enough and control it within sufficiently narrow limits that the speed of operation of the heads can be increased. I provide for feeding the stock through the machine by means which precisely control its movement during the actual forming operation, the stock moving ahead continuously, although at somewhat varying speed, and never stopping during a run of the machine. I preferably feed the stock by feeding means separate from the heads but during the interval when work is being done on the stock I preferably transfer control of it to the heads themselves. However, in certain instances the stock may be fed entirely by means associated with the heads themselves and at other times the stock may be sufficiently controlled by the feeding means separate from the heads alone. For relatively difficult work I prefer to feed the stock by means separate from the heads and to render such feeding means inoperative during the interval when the heads or dies carried thereby are acting on the stock, the stock during such interval being controlled only by the heads or dies or by feeding means carried thereby.

I also find it desirable to guide the stock in the machine by guiding means moving with the stock during operation thereon by the forming heads. I preferably employ guiding and stripping means for the stock oscillatable generally in the plane of the stock as it moves into position to be operated on by the heads and movable with the stock during performance of the stamping or other operation thereon.

I also provide for very rapid setting up and adjustment of the machine for particular jobs and for rapid removal and replacement of parts, particularly dies and feeding means. This results in a most important reduction of set-up time so that the machine is idle for a far smaller part of the potential productive time in addition to the fact that it operates at greatly increased speed during production.

In this introductory portion of the specification I have not attempted to catalog all of the details, objects and advantages of the invention; and further details, objects and advantages will become apparent as the following description of certain present preferred embodiments thereof proceeds.

In the accompanying drawings I have shown certain present preferred embodiments of the invention, in which Figure 1 is a plan view of a forming machine with a portion cut away and with the top cover removed;

Figure 5 is a fragmentary vertical transverse cross-sectional view to enlarged scale taken on the line V—V of Figure 1;

Figure 6 is a fragmentary vertical transverse cross-sectional view to enlarged scale taken on the line VI—VI of Figure 1;

Figure 7 is a fragmentary vertical transverse cross-sectional view to enlarged scale taken on the line VII—VII of Figure 1;

Figure 8 is a fragmentary vertical longitudinal cross-sectional view similar to Figure 2 but showing a modified construction;

Figure 9 is a horizontal cross-sectional view taken on the line IX—IX of Figure 8;

Figure 20:
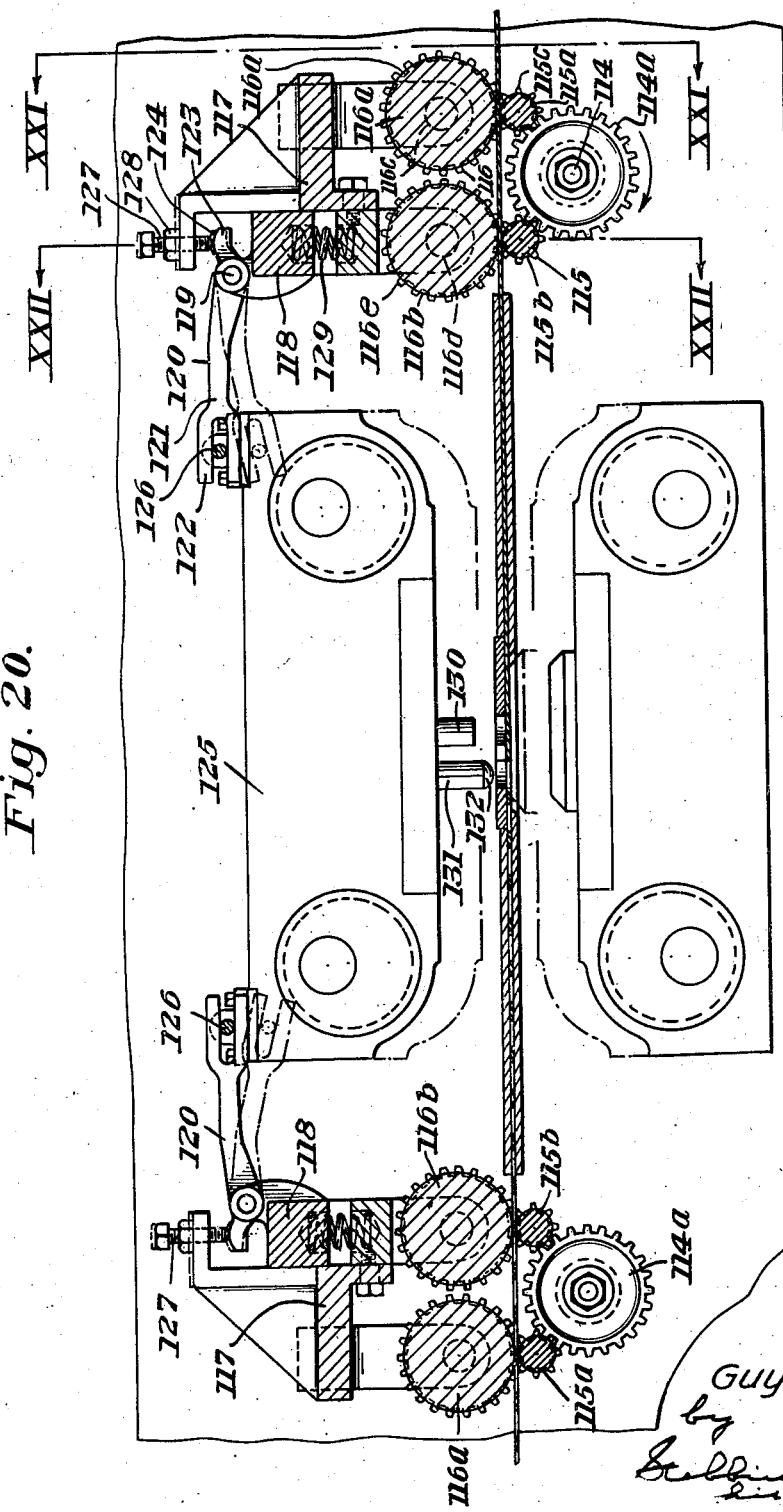
Figure 21:
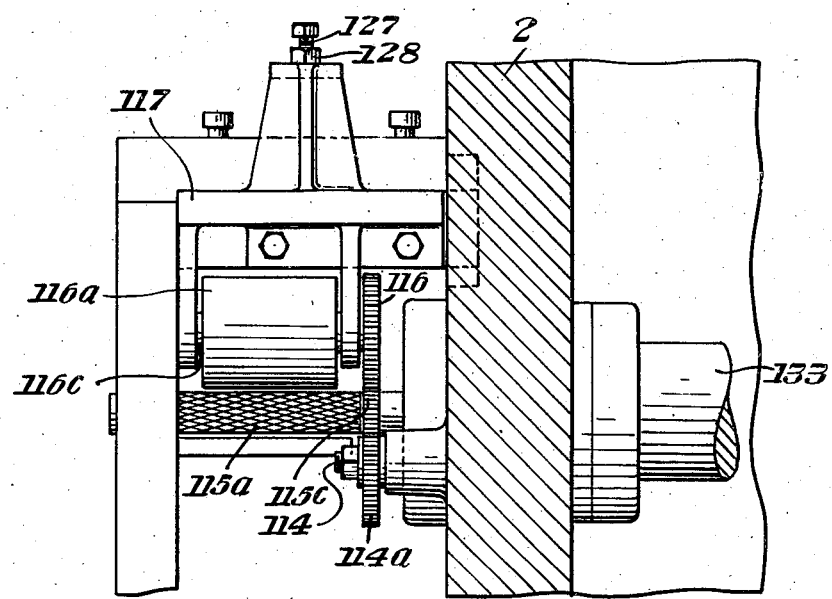
Figure 22:
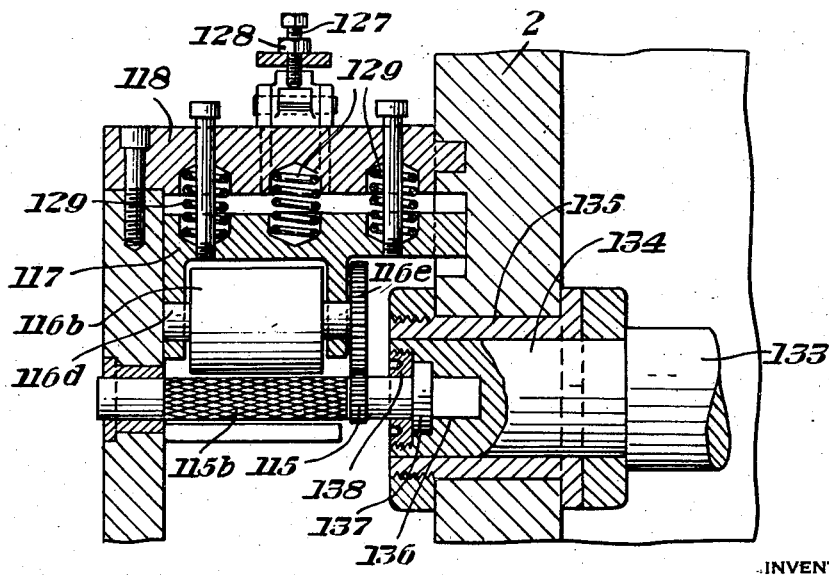

Figurt 10 is a plan view of the stock guide and stripper shown in Figures 8 and 9 with a portion cut away;

Figure 11 is a plan view of the bottom plate of said stock guide and stripper;

Figure 12 is a detail cross-sectional view showing one of the shafts carrying the forming heads with a counterweight applied to it, taken on the line XII—XII of Figure 7;

Figure 13 is a fragmentary elevational view partly in vertical transverse cross section showing a modified form of counterweighted shaft;

Figure 14 is a fragmentary vertical transverse cross-sectional view of a modified construction showing means for adjusting the eccentricity or throw of the head operating means;

Figure 15 is a vertical longitudinal cross-sectional view taken on the line XV—XV of Figure 14;

Figure 16 is a fragmentary vertical transverse cross-sectional view of a modified construction showing one form of work feeding means;

Figure 17 is a vertical longitudinal cross-sectional view taken on the line XVII—XVII of Figure 16;

Figure 18 is a fragmentary vertical transverse cross-sectional view of a modified construction showing another form of work feeding means;

Figure 19 is a vertical longitudinal cross-sectional view taken on the line XIX—XIX of Figure 18;

Figure 20 is a fragmentary view partly in elevation and partly in vertical longitudinal cross section of a modified form of structure;

Figure 21 is a vertical transverse cross-sectional view to enlarged scale taken on the line XXI—XXI of Figure 20; and Figure 22 is a vertical transverse cross-sectional view to enlarged scale taken on the line XXII—XXII of Figure 20.

Referring now more particularly to the drawings, the forming machine is mounted in a casing 2. Resiliently supported in the lower part of the casing 2 through coil springs 3 is an electric motor 4 having a shaft 5. The electric motor 4 furnishes the power for the entire machine.

The machine comprises upper and lower forming heads 6 and 7, respectively. In the structures shown each of the forming heads is carried and operated by two shafts which are driven in unison, such shafts having thereon eccentric means which impart to the forming heads their operative movements. The upper head 6 is carried by shafts 8 and 9 and the lower head 7 is carried by shafts 10 and 11. Keyed to the motor shaft 5 are pulleys 12 and 13. Keyed to the shaft 10 is a pulley 14 and keyed to the shaft 11 is a pulley 15. A belt 16 operates in the pulleys 12 and 14 and a belt 17 operates in the pulleys 13 and 15. Thus through the belts 16 and 17 the respective shafts 10 and 11 are driven from the motor shaft 5. The pulleys 12 and 13 are of the same size and the pulleys 14 and 15 are of the same size, so the shafts 10 and 11 are driven at the same speed. The belts are arranged so that the shafts 10 and 11 are also driven in the same direction. The axes of the shafts 10 and 11 are in the same horizontal plane and the axes of the shafts 8 and 9 are in the same horizontal plane while the axes of the shafts 8 and 10 are in the same vertical plane and the axes of the shafts 9 and 11 are in the same vertical plane.

Keyed to the shaft 10 is a gear 18 and keyed to the shaft 11 is a gear 19 identical with the gear 18. Keyed to the shaft 8 and meshing with the gear 18 is an identical gear 20. Keyed to the shaft 9 and meshing with the gear 19 is an identical gear 21. Through these gears the shafts 8 and 9 are rotated in unison with the shafts 10 and 11, at the same speed but in the opposite direction. The casing 2 carries near its top a non-rotating shaft 22 on which is mounted for rotation by means of a bearing member 23 a gear 24 identical with the gears 18, 19, 20 and 21. The gear 24 meshes with the gears 20 and 21 and is for the purpose of insuring rotation of the shafts 8, 9, 10 and 11 at the same speed despite any tendency of either of the belts 16 and 17 to slip. The shaft 8 also carries another gear 25 identical with the gear 20 and the shaft 9 also carries another gear 26 identical with the gear 21. Mounted in the casing parallel to the shafts 8, 9, 10 and 11 are shafts 27 and 28. The shaft 27 carries a gear 29 meshing with the gear 25 and the shaft 28 carries a gear 30 meshing with the gear 26. The gears 29 and 30 are identical with the other gears mentioned so that the shafts 27 and 28 are also driven in unison with the shafts 8, 9, 10 and 11 and in the same direction as the shafts 10 and 11. The shafts 27 and 28 are primarily for the purpose of operating feeding means as will presently appear.

Figure 3:
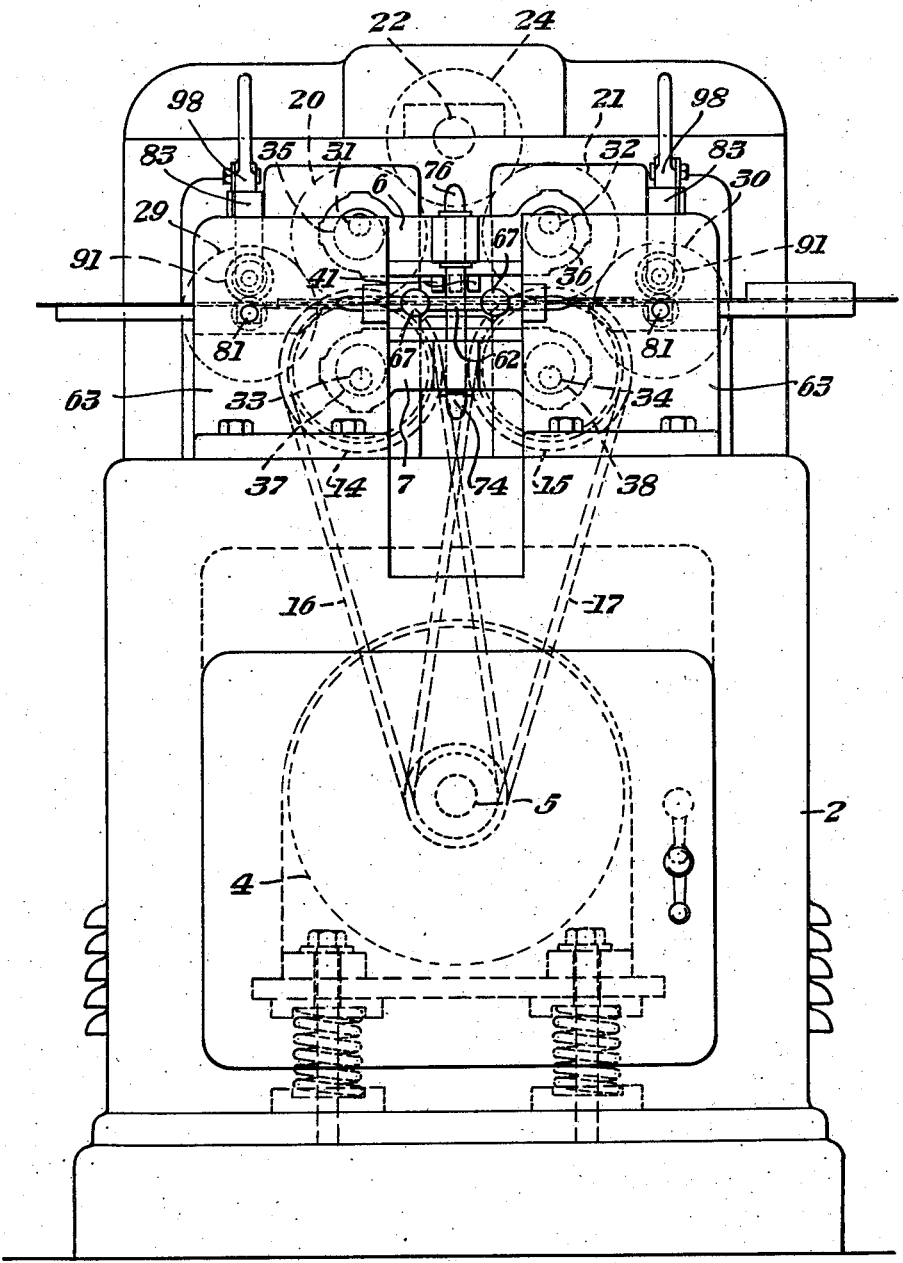
Figure 3 is a front elevational view of the forming machine.

As above described, the shafts 8, 9, 10 and 11 are mounted for rotation in the casing 2. Formed integrally with the forward end of each of these shafts, i. e., the end nearest the eye viewing Figure 3, is an eccentric pin. The eccentric pins on the shafts 8, 9, 10 and 11 are designated, respectively, by reference numerals 31, 32, 33 and 34. As shown in Figure 7, the eccentric pins project forwardly from the ends of the driving shafts and are adapted to have the heads 6 and 7 applied to them and maintained in place thereon in such manner that they may be easily removed and replaced, as will be explained. The head 6 carries eccentric bushings 35 and 36 adapted to be slipped over the respective pins 31 and 32 and the head 7 carries eccentric bushings 37 and 38 adapted to be slipped over the respective pins 33 and 34. Each of the bushings may be rotated in its head to a desired angular position and maintained in that position by set screws 39. By suitable rotative positioning of the eccentric bushings the clearance between the heads 6 and 7 when they are closest together may be determined. The shafts 8 and 9 have their eccentric pins 31 and 32 similarly oriented relatively to the shaft axes and also the eccentric bushings 35 and 36 are similarly oriented so that upon rotation of the shafts 8 and 9 the head 6 will, while maintaining its orientation, be moved through a circular path. The same applies with respect to the lower head 7. Also the shafts 8 and 9 will ordinarily have their eccentric pins 31 and 32 turned 180° from the corresponding positions of the eccentric pins 33 and 34 on the shafts 10 and 11 and the eccentric bushings on all four pins will be arranged so that in operation the upper and lower heads partake of opposed synchronous movement, approaching each other during the same interval, reaching their respective positions in which each is nearest the axes of the shafts of the other at the same time, and the heads when closest together moving laterally in the same direction.

Figure 2:
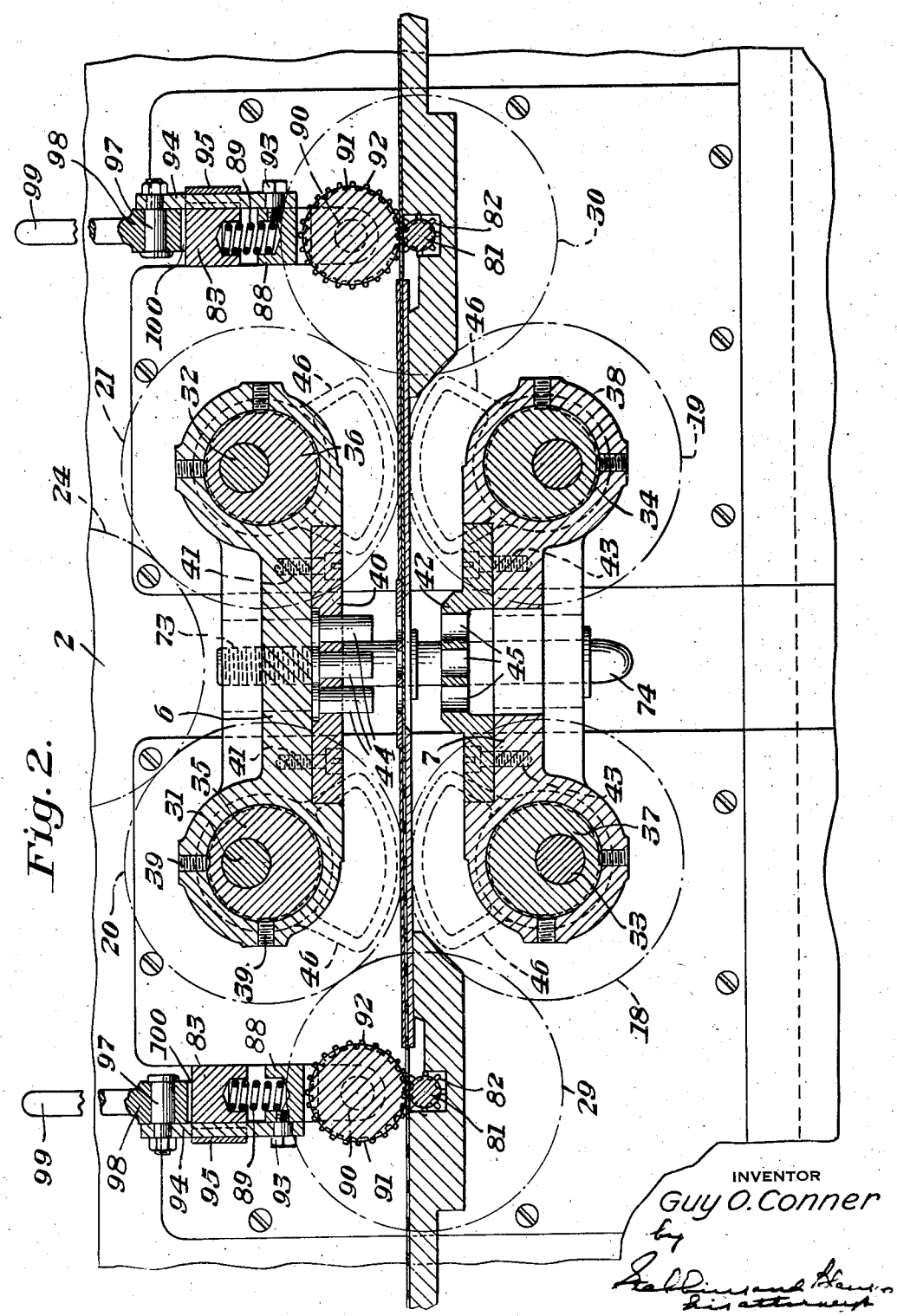
Figure 2 is a fragmentary vertical longitudinal cross-sectional view to enlarged scale of a portion of the forming machine shown in Figure 1 and taken on the line II—II of that figure.

In the structures shown in the drawings the heads carry cooperating stamping dies. In Figure 2 an upper die 40 is fastened to the head 6 by screws 41 and a lower die 42 is fastened to the head 7 by screws 43. The upper die 40 carries three downwardly projecting male die members 44 and the lower die 42 is provided with three corresponding female die cavities 45, each of which during operation of the machine receives one of the die members 44. During operation of the machine the dies move in intersecting circles, acting on the work therebetween as they move generally toward each other and parting contact with the work as they move away from each other.

I have found that one of the factors which has heretofore been considered as a primary factor in limiting speed in stamping and similar operations—excessive vibration which imposes severe strains upon the machine parts and foundation bolts and tends to "tear apart" the machine—can be virtually eliminated by proper application to the shafts upon which the heads are mounted of counterbalancing means. I fasten to each of the shafts 8, 9, 10 and 11 a counterweight, one form of which is shown in Figures 7 and 12 and designated by reference numeral 46. The counterweight consists of a body portion 47 which surrounds the shaft, suitable means 48 being provided for insuring rotation of the counterweight with the shaft, and a portion 49 adapted to receive material such, for example, as mercury, designated by reference numeral 50. A removable plug 51 permits the mercury to be introduced into the portion 49 of the counterweight and to be withdrawn therefrom. Whatever amount of mercury or other material may be desired may be introduced into the counterweight so that the effect of the counterweight may be varied at will.

I find that for most operations the counterweights should be applied to the shafts so that when the heads are closest together the heaviest portions of the counterweights are approximately farthest apart and vice versa. Sometimes it may be desirable to slightly advance or retard the counterweights so that they will be not exactly in the position just mentioned relatively to the heads, but the proper setting of the counterweights may be determined without difficulty for each set-up. I find that the use of the counterweights eliminates serious vibration at speeds which would have been impossible of attainment heretofore due to vibration.

A different form of counterweighted shaft is shown in Figure 13. In that figure there is illustrated a shaft 52 (which may correspond, for example, to the shaft 8 in Figure 7) having a longitudinal bore 53 extending from the end of the shaft to a point 54 where it is intersected by a radial bore 55. The counterweight 56 is applied to and held in place on the shaft in substantially the same manner as above explained with relation to the form of counterweight shown in Figure 12 except that the material receiving portion 57 of the counterweight 56 has a passage 58 communicating with the radial bore 55 in the shaft 52. An elbow 59 is threaded into the end of the shaft and is closed by a plug 60. Mercury may be introduced into the counterweight or withdrawn therefrom through the bore 53. This arrangement greatly facilitates changing the mass or moment of inertia of the counterweight. Preferably the passage 58 is circumferentially elongated to permit of circumferential adjustment of the position of the counterweight on the shaft while still maintaining communication between the material receiving portion 57 of the counterweight and the bore 55.

Figure 1:
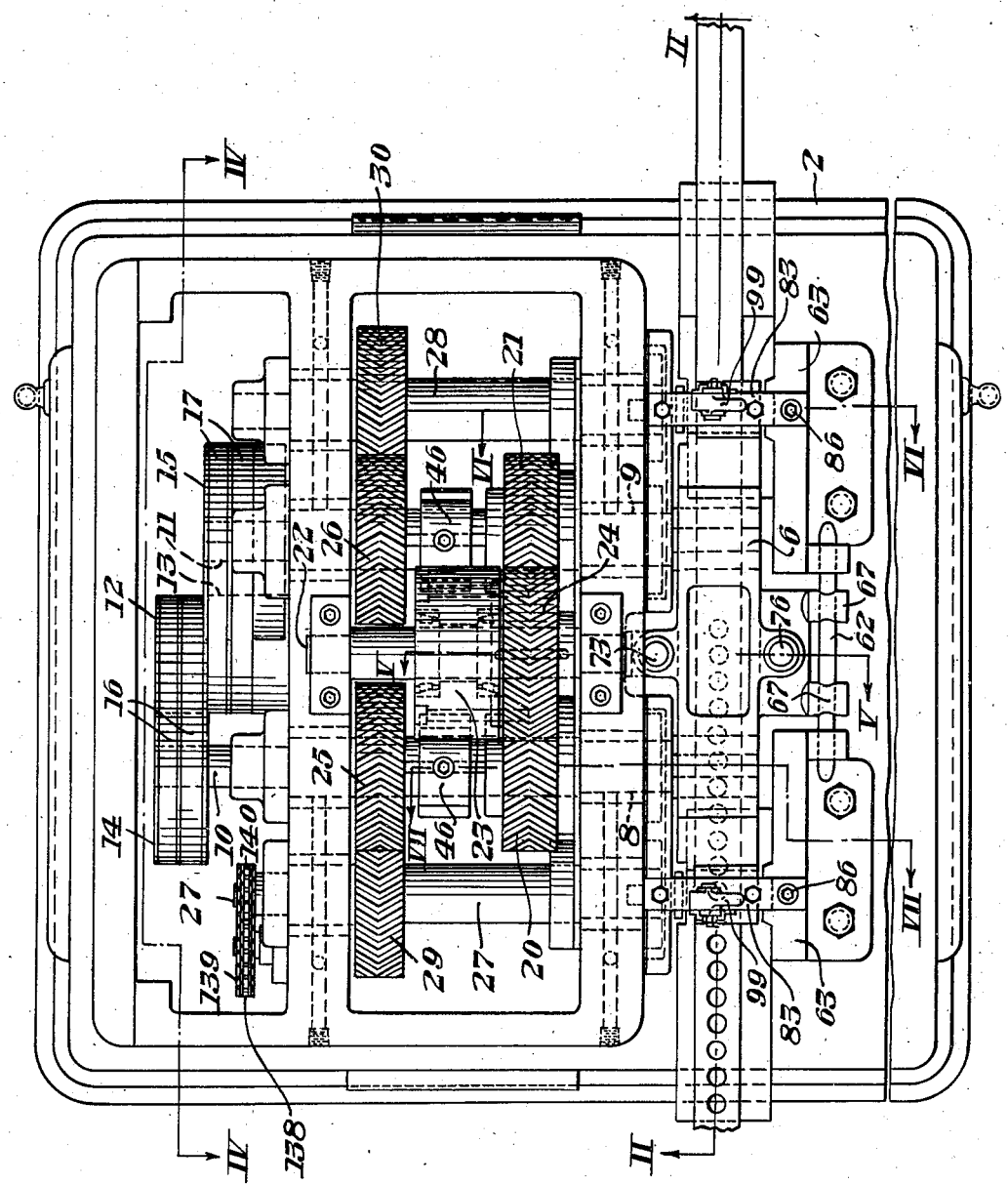

I provide a work guide and stripper operable to control the work operated on by the heads or dies and which, as above mentioned, moves with the stock during performance of the stamping or other operation thereon. I shall refer to this portion of the mechanism as a guide, although it is to be understood that it preferably performs both a guiding and a stripping function. The guide is itself supported and guided by a forwardly projecting horizontal guiding bar 61 on the casing 2 and a guide pin 62 stationarily supported by positioning members 63. The work guide is moved back and forth longitudinally, i. e., from right to left and vice versa, viewing Figure 1, by means carried by the heads, as will presently appear, and is guided for rectilinear movement by the members 61 and 62. The work guide shown in Figures 1 to 7, inclusive, and that shown in Figures 8 to 11, inclusive, are identical except for the shape of the opening surrounding the dies; such opening in any case has to be of such size and shape as to permit the dies to operate on the work therethrough. Since except for the shape of the opening the work guides in the two embodiments are the same, the guide will be described with especial reference to Figures 8, 9, 10 and 11, which show it most clearly. The guide comprises a bottom plate shown in Figure 11 and designated by reference numeral 64 and having in addition to two lines of screw holes 64a an opening 65 through which the dies act on the work and circular openings 66 for receiving vertical guide pins as will presently be described. The plate 64 also has forward projections 67 having horizontal bores 68 for receiving the guide pin 62. The plate 64 has a rearward projection 69 provided in its edge with a groove guidingly embracing the bar 61 (see Figure 5) so that the plate 64 is guided for rectilinear movement by the stationary guide members 61 and 62. Fastened to the top of the plate 64 by screws 70 threaded into the holes 64a are longitudinal strips 71 between which the work to be acted upon is adapted to pass and be guided and top plates 72 bridging the space between the strips 71 so that the work passes through the guide lying on top of the plate 64, between the strips 71 and beneath the plates 72.

Threaded into the upper head 6 at 73 (Figure 5) is a downwardly projecting vertical guide pin 74 and threaded into the lower head 7 at 75 is an upwardly projecting vertical guide pin 76. Formed in the lower head 7 and lined by a bushing 77 is a guide opening for the pin 74 which guidingly receives such pin, and formed in the upper head 6 and lined by a bushing 78 is a guide opening for the pin 76 which guidingly receives such pin. The pins 74 and 76 pass through the circular openings 66 in the plate 64, as also shown in Figure 5.

Thus during operation of the machine the guide partakes of oscillatory movement in a horizontal plane between the heads, such oscillatory movement being the same as the movement of traces of the heads on a horizontal plane coinciding with the plane of the guide. In other words, the guide moves back and forth with the heads and its horizontal velocity is at all times the same as the horizontal velocity of the heads. Consequently at the time the work is being acted on by the dies the guide is moving at exactly the speed at which the work should be moved. This materially assists in controlling the work and during the operative stroke of the dies eliminates friction between the work and the guide. During the oscillating movement of the guide the pins 74 and 76 move up and down within the circular openings 66 in the guide but such up and down movement has no similar effect on the guide because it is in turn guided by the means 61 and 62 previously described and can move only in a horizontal plane. Also, as above mentioned, the guide acts as a stripper to strip the work from the male die and this function is greatly facilitated by the fact that during the entire interval of contact between the dies and the work being operated on thereby the guide moves with the work and also horizontally with the dies.

The lower head is provided below the female die with a downwardly directed outwardly tapered or flaring opening 79 (Figure 5) through which the blanks or products stamped or formed out of the stock passing through the machine are delivered to a suitable receptacle or conveyor (not shown) positioned below the head 7. Thus the blanks drop straight down from the stock from which they are severed and there is no problem of removal of blanks from the path of successively delivered blanks.

Several forms of work or stock feeding means are shown in the drawings. All of these are designed particularly for feeding strip through the machine. As I have previously indicated, individual blanks rather than strip may be fed through the machine and operated upon and for certain types of work feeding means such as herein disclosed could be used for feeding individual blanks. However, the feeding means herein disclosed are not recommended for the feeding of individual blanks, feeding means for that purpose being disclosed and claimed in my copending application Serial No. 507,936, filed Oct. 28, 1943. Another improved form of feeding means is described and claimed in my copending application Serial No. 507,937, filed Oct. 28, 1943.

One form of feeding means is shown in Figures 2 and 6. The stock being acted on may, for example, move from right to left, viewing Figure 2. The shaft 28 has an axial extension 80 of reduced diameter forming or carrying a lower feed roll 81 shown in Figure 6 as having a roughened or knurled surface. The extension 80 has fixed thereto a pinion 82. Mounted above the lower feed roll 81 is a head 83 having a portion 84 entering a suitable opening provided therefor in the casing 2 and having its outer end supported by one of the positioning members 63 bolted to the casing at 85. The head 83 is bolted to the positioning member 63 at 86. Passing loosely through openings in the head 83 are two bolts 87. Each of these bolts is threaded into an upper roll support 88. Three coil springs 89 are compressed between the head 83 and the upper roll support 88 so as normally to press the support 88 downwardly away from the head 83. However, downward movement of the support 88 relatively to the head 83 is limited by the heads of the bolts 87. Journalled in the support 88 upon a shaft 90 is an upper feed roll 91. The shaft 90 carries a gear 92 meshing with the pinion 82 so that the upper feed roll 91 is driven from the shaft 28 through the pinion 82 and the gear 92 and is pressed down against the knurled lower feed roll 81 by the springs 89.

Fastened to the support 88 at 93 and extending upwardly is a bar 94. A strap 95 which embraces the bar 94 and is screwed to the head 83 at 96 on each side of the bar guides the bar vertically relatively to the head 83. Pivoted to the upper end of the bar 94 at 97 is a lever 98 having a handle 99 and a cam portion 100 as shown in Figure 6. The purpose of the lever 98 is to enable raising of the upper feed roll 91 away from the lower feed roll 81 to inoperative position whereby to render the feed rolls inoperative to feed stock. To raise the upper feed roll the lever 98 is turned in the clockwise direction, viewing Figure 6, so that the cam portion 100 bears upon the upper surface of the head 83. The result of this is to raise the pivot 97 and with it the bar 94, the support 88 and the upper feed roll 91. The springs 89 admit of sufficient compression to thus raise the upper feed roll to inoperative position. The pinion 82 and gear 92 may be designed so that they remain in mesh despite the raising of the roll 91.

The pressure exerted between the feed rolls 81 and 91 may, of course, be determined by the force exerted by the three springs 89. In the structure shown in Figures 2 and 6 the feed rolls 81 and 91 remain always in operative position unless they are rendered inoperative by manual operation of the lever 98. The diameter of the lower feed roll 81 is such that when the feed rolls 81 and 91 are feeding stock through the machine the stock during the interval when the dies are acting on it will be fed at a speed which will substantially equal the horizontal speed of the dies. The horizontal speed of the dies is, however, not constant but variable. It increases from zero to a maximum when the dies are closest together and then decreases to zero. When very thin stock is being acted upon by the dies the interval of contact between the dies and stock is relatively short with the result that the dies are in contact with the stock only for a very brief period when the dies are moving approximately at maximum horizontal speed. But the feed rolls are designed to advance the stock at approximately the maximum horizontal speed of the dies so that at the time the dies contact the stock the stock is moving substantially at the speed of the dies. The stock may not be moving at precisely the speed of the dies when the dies engage the stock, but when very thin stock is being operated on this is not critical. The stock may buckle or ripple slightly between the feed rolls and the dies upon each cycle of the forming heads, but for very thin stock this may not adversely affect the operation. Of course when the dies are in gripping engagement with the stock the stock at the dies can only move with the longitudinal speed of the dies regardless of the speed of the feed rolls 81 and 91. Other forms of feeding mechanism to be described below are adapted particularly for forming thicker stock when the buckling or rippling of the stock, if the feeding means of Figures 2 and 6 were used, would be objectionable.

The shaft 27 also operates feeding means similar to the feeding means just described so that the stock is advanced by feeding means both at the portion thereof which has not yet reached the dies and at the portion thereof which has passed the dies. Thus in effect the stock is both pushed into the dies and pulled out of the dies. This feeding of the stock, particularly when coupled with the movable guide as described above, is highly desirable and contributes largely to the attainment of speeds much higher than those heretofore considered possible.

As shown in the drawings (see particularly Figures 6 and 7) the positioning members 63 cooperate with the casing 2 in journalling and maintaining properly in place the feeding means and the forming heads. The shafts which carry the primary load are journalled in the casing 2, but the portions of such shafts whereon the heads and feeding rolls are mounted project from the casing. The positioning members 63 are easily removable to permit removal and replacement of the heads and feeding means and also to permit of adjustment and, when necessary, repair of the operating parts. The positioning means 63 may be provided in duplicate sets, and, while one set is applied to the machine and is in use in the forming of stock, another set may be used for setting up or preparing for a succeeding run using different stock or producing a different product. Then at the end of the first run the set of positioning means 63 which has been in use can easily be removed, together with the heads and feed rolls if desired, and the other set of positioning means and the substitute heads and/or feed rolls may easily and quickly be applied for the succeeding run. This ability to very quickly change, adjust and repair the heads and the feed rolls is of great importance because of the saving of the time required to "set up" for a job.

Referring now to Figures 14 and 15, these figures show a modified form of eccentric means for mounting and operating the forming heads. One of the driving shafts is shown in Figure 14 at 101. The shaft has a reduced tapered extremity 102 which is eccentric with respect to the axis of the shaft. An eccentric internally tapered collar 103 fits over the extremity 102, providing an outer cylindrical eccentric upon which one of the forming heads 104 is mounted similarly to the mounting of the heads 6 and 7 on the pins 31, 32, 33 and 34. A screw 105 may be screwed into a threaded opening extending into the extremity 102 from the end surface thereof, such opening being coaxial with the shaft 101. Integral with the screw 105 is a flange 106 and an axial bearing extension 107 whose extremity is squared as shown at 108 for the reception of a wrench. When the collar 103 has been adjusted as desired on the extremity 102 the screw 105 is tightened, the flange 106 pressing the collar inwardly as shown in Figure 14. The bearing extension 107 is journalled in one of the positioning members 63 and aids in furnishing proper operative support to the projecting end of the shaft 101.

The structure shown in Figures 14 and 15 can be used to adjust the throw or eccentricity of the eccentric upon which the head is mounted. To assist in adjustment a scale 109 may be formed on the end face of the hub 110 and an index mark may be provided on the outer cylindrical surface of the collar 103. Thus the eccentricity or throw of the eccentric means for mounting the heads may be easily and quickly adjusted.

Referring now to Figures 16 and 17, these figures show a modified feed roll arrangement which may be used in place of the feed roll arrangement described above and shown in Figures 2 and 6. The significant difference between the structure of Figures 16 and 17 and that of Figures 2 and 6 is that the lower feed roll 111 of Figures 16 and 17 is not circular but has a flattened portion 112. When the flattened portion 112 of the lower feed roll 111 comes opposite the upper feed roll the gripping of the stock between the rolls will be interrupted. Downward movement of the upper feed roll relatively to the lower feed roll is limited so that when the portion 112 of the lower feed roll comes opposite the upper feed roll a gap which is wider than the thickness of the stock will be temporarily formed between the feed rolls with the result that the feeding action of the rolls upon the stock will be interrupted. The feed rolls in such case will be designed so that they become inoperative just as the dies take the stock and so that at that instant the speed of the stock is substantially equal to the longitudinal speed of the dies. In other words, the stock is fed by the feed rolls up to the instant at which the dies grip the stock at the beginning of the stamping or forming movement. At the instant the dies grip the stock the feed rolls become inoperative and remain inoperative during the action of the dies on the stock. Just as the action of the dies on the stock is completed the feed rolls again become operative. Thus the stock is controlled at all times and moves forward continuously through the machine at a somewhat varying speed. Although the speed varies somewhat the momentum of the stock continues and the speed variations are not so great that they cannot easily be brought about by the feeding means and the dies.

Referring now to Figures 18 and 19, these figures show a further modification of the feed rolls in which a series of collars 113 constitutes the lower feed roll, the collars having portions cooperating with the upper feed roll to grip the stock and other portions not so cooperating therewith. The collars are arranged so that at least some portion of the lower feed roll cooperates with the upper feed roll during the time when it is desired to feed the stock by the rolls, and when it is desired that the rolls relinguish control of the stock at the instant when the dies take the stock a portion of the lower feed roll of less diameter than the portions which cooperate with the upper feed roll to feed the stock comes opposite the upper feed roll and the feeding function of the feed rolls is discontinued. As soon as the dies have completed their action on the stock one of the portions of relatively great diameter of the lower feed roll comes opposite the upper feed roll and the feed rolls resume feeding relationship to the stock. The operative effect of the structure shown in Figure 18 is the same as that of the structure shown in Figure 16 except that in Figure 18 the interval during which the rolls relinguish control of the stock may be adjusted by turning one or more of the collars 113 on their supporting shaft 113a.

Referring now to Figures 20, 21 and 22, these figures show a further modified form of feeding means and other features contributing to improved operation. In Figure 20 feed rolls are shown both for acting on the portion of the strip which has not yet reached the dies and for acting on the portion of the strip which has passed through the dies as in Figure 2. The strip in Figure 20 as in Figure 2 is advanced from right to left through the machine. As the feed rolls are duplicated at the entering and discharge ends of the machine description of one set of such rolls will suffice for both.

The feed rolls at the entering end of the machine (the right-hand end) in Figure 20 are driven by a shaft 133 (Figures 21 and 22) which corresponds with the shaft 28 of Figure 6. The shaft 133 has a reduced portion 134 which passes through a bearing sleeve 135 in the casing. The extremity of the shaft is provided with an axial bore 136 receiving one end of a feed roll 115b. The bore and the roll have enlarged portion 137. Preferably the extremity of the roll is non-circular and the pocket in which it is received in the end of the shaft 133 is likewise non-circular, thus insuring turning of the roll when the shaft turns. A nut 138 screwed into the end of the shaft and bearing against the enlarged portion 137 of the roll holds the roll in place in the end of the shaft. This structure is particularly useful with the structure above described which enables rapid and easy removal, replacement and adjustment of the heads, dies and feeding means.

The roll 115b is the bottom roll of a set of feed rolls, the cooperating upper roll being the roll 116b. It may be desirable to employ more than one set of feed rolls at one or both ends of the machine. In the structure shown in Figures 20, 21 and 22 two sets of feed rolls are employed in each end of the machine. The number of sets of feed rolls may be increased as desired.

The lower feed roll of the right-hand set of feed rolls at the entering end of the machine viewing Figure 20 is the roll 115a which may be suitably journalled in the casing for rotation, but which is driven from the roll 115b as will now be described and hence need not be provided with independent driving means. The roll 115b carries a pinion 115 and the roll 115a carries a pinion 115c. Mounted in the casing is a stub shaft 114 carrying a gear 114a which meshes with the pinions 115 and 115c. Thus when the shaft 133 is driven it turns the roll 115b and through the pinion 115, the gear 114a and the pinion 115c in turn drives the roll 115a.

The upper feed roll which cooperates with the lower roll 115a is the roll 116a. The roll 116a is carried by a shaft 116c and the roll 116b is carried by a shaft 116d. Both of the shafts 116c and 116d are journalled in a head 117 which is vertically movable. The shaft 116c carries a gear 116 which meshes with the pinion 115c. The shaft 116d carries a pinion 116e which meshes with the pinion 115.

Mounted in the casing is a stationary support 118 to which is pivoted at 119 a lever 120 having a long arm 121 with a forked end 122 and a short arm 123 having a cam surface 124. The upper forming head 125 carries a pin 126 which rides in the fork 122. When the upper forming head 125 rises, the arm 121 rises and the arm 123 falls and vice versa. The head 117 carries a screw 127, the lower end of which bears on the cam 124 as shown in Figure 20. The position of the screw may be adjusted and the screw maintained in desired adjusted position by means of a nut 128. Coil springs 129 bear between the head 117 and the support 118 to urge the head downwardly relatively to the support. The head 117 is held up by the bearing of the screw 127 on the cam 124 of the short arm 123 of the lever 120.

When the upper head 125 rises the arm 123 moves downwardly and the springs 129 cause the head 117 and the upper feed rolls to move downwardly into cooperative relationship with the lower feed rolls to feed stock into the machine. When, however, on the succeeding stroke the upper head 125 moves downwardly the arm 123 is raised, which in turn raises the head 117 against the action of the springs 129 and separates the upper feed rolls from the lower feed rolls by a space greater than the thickness of the stock so that the feed rolls become inoperative. The parts are designed and adjusted so that the feed rolls become inoperative just as the work is taken by the dies and resume operation just as the dies relinquish the work. The result is similar to that obtained by use of the feeding devices shown in Figures 16, 17, 18 and 19.

In Figure 20 there is shown a male die member 130 which operates similarly to the male die members 44 in cooperation with a suitable female die member. There is also shown a feeding pin 131 having a tapered or rounded nose 132 and which is disposed to the left of the die member 130 viewing Figure 20 and at a distance therefrom substantially equalling the distance which the stock advances between operations. The feeding pin 131 is of substantially the same diameter as the die member 130 or very slightly smaller. The pin 131 is longer than the die 130, its length being such that when the upper head 125 is in its uppermost position the pin clears the stock, but when the head is well started on its downward stroke it enters an opening made in the stock by the member 130 on the previous cycle. In other words, the pin 131 operating in holes made successively in the stock by the dies controls and feeds the stock while it is being operated on by the dies. In one cycle of operation a hole is formed in the stock by the dies and on the succeeding cycle the pin 131 enters that hole and advances the stock and controls its movement.

While the feeding pin 131 is shown in Figure 20 as being used in conjunction with the roll feeding apparatus above described, it is possible to use the feeding pin without the roll feeding mechanism and the latter may be dispensed with. However, especially when relatively heavy stock is to be operated on at high speeds, I deem it preferable to employ the roll feeding mechanism and the feeding pin in combination. It will be understood, of course, that the feeding pin may be dispensed with and the dies themselves relied upon to accomplish the controlling and feeding function while they are acting on the work.

Figure 4:
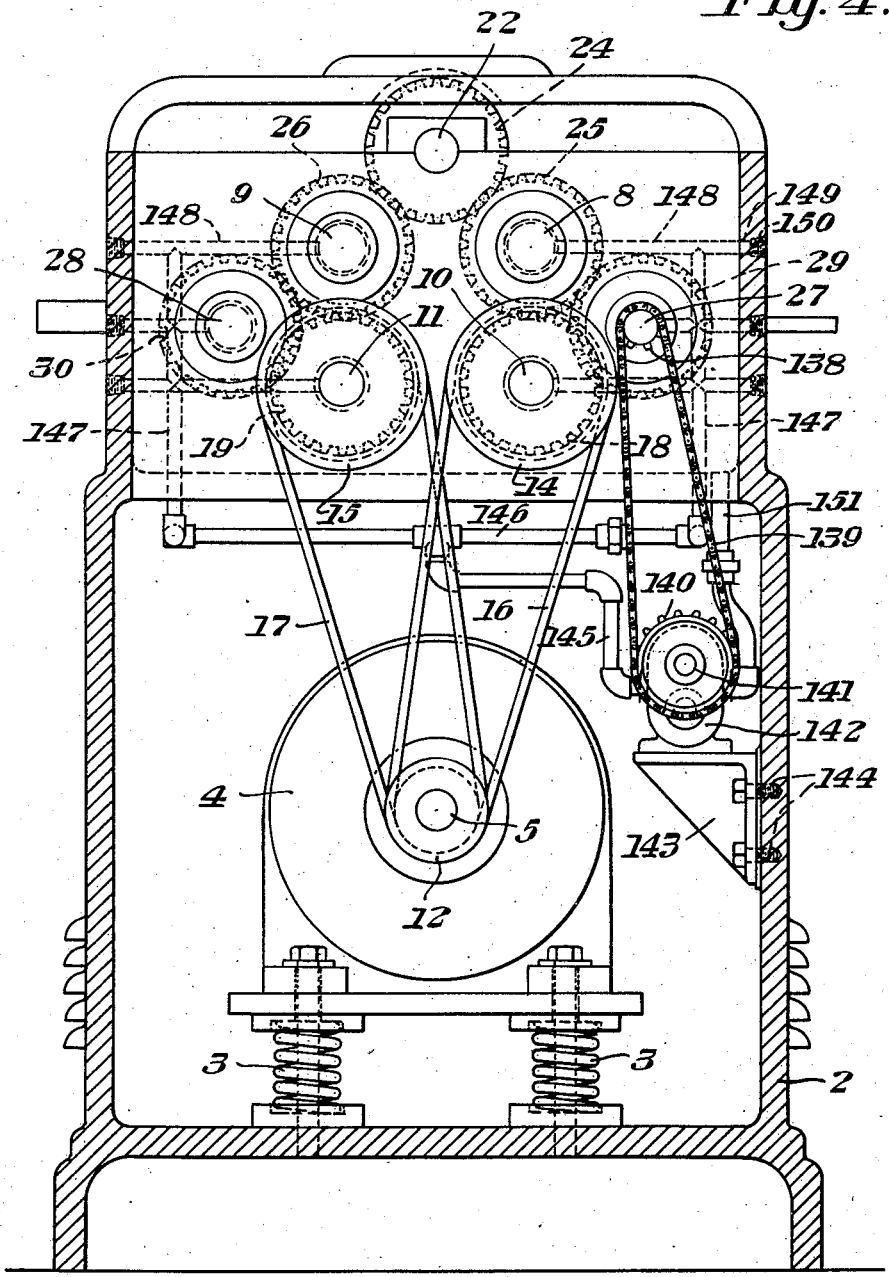
Figure 4 is a vertical longitudinal cross-sectional view to somewhat reduced scale taken on the line IV—IV of Figure 1.

The forming machine is of course suitably lubricated. One lubricating system is illustrated more or less diagrammatically in Figure 4. Keyed to the shaft 27 is a sprocket 138 about which is trained a sprocket chain 139 which also passes about and drives a sprocket 140 keyed to a shaft 141 which either directly or through intermediate gearing drives an oil pump 142 carried upon a support 143 connected with the casing 2 at 144. The discharge side of the oil pump communicates with a pipe 145 which delivers oil under pressure to a header 146 and thence to vertical pipes 147 communicating with branch pipes 148 which deliver the oil to the bearings of the various shafts as indicated in Figure 4. For convenience and accessibility the pipes 148 may be let into the casing 2 as shown at 149 and their outer ends closed with removable plugs 150. The oil passing from the shaft bearings drops into an oil pan in the upper portion of the casing and flows by gravity through the return pipe 151 back to the pump 142, preferably passing through a strainer and, if desired, also a cooler, before reaching the pump.

While I have shown and described certain present preferred embodiments of the invention it is to be distinctly understood that the invention is not limited thereto but may be otherwise variously embodied within the scope of the following claims.

I claim:

1. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work controlling means between and separate from said heads, means for guiding said work controlling means for substantially rectilinear movement, said movement being substantially in the direction of lateral movement of said heads when they are closest together, and means for oscillating said work controlling means synchronously with operation of said heads and at a speed which at the time said heads are closest together is substantially equal to the lateral speed of said heads.

2. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, a work guide and stripper between said heads, means for guiding at all times said work guide and stripper for movement substantially in the direction of lateral movement of said heads when they are closest together and means connected with at least one of said heads for oscillating said work guide and stripper synchronously with operation of said heads.

3. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, a work guide and stripper between said heads, means for guiding at all times said work guide and stripper for movement substantially in the direction of lateral movement of said heads when they are closest together and driving means for the work guide and stripper connected with at least one of said heads and engaging the work guide and stripper to oscillate the same laterally with said heads.

4. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work controlling means between said heads, means for guiding at all times said work controlling means for movement substantially in the direction of lateral movement of said heads when they are closest together and driving means for said work controlling means extending between said heads and slidably engaging said work controlling means to oscillate the same laterally with said heads.

5. A forming machine comprising opposed cooperating forming heads each mounted for generally rotary movement while being guided so as to maintain substantially fixed orientation, said heads during operation of the machine moving toward nad away from each other and when closest together moving also laterally generally in the same direction, means carried by said heads for acting on work lying therebetween and means separate from said last mentioned means carried by at least one of said heads and effective when said last mentioned means are not acting on the work for advancing the work between said heads.

6. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, means carried by said heads for acting on work lying therebetween and means separate from said last mentioned means carried by at least one of said heads engaging the work during a portion only of each cycle of said heads, during part of which portion said last mentioned means are not acting on the work, to advance the work laterally.

7. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, dies carried by said heads for operating on work therebetween and means carried by at least one of said heads engaging a portion of the work operated on by the dies in a previous cycle of said heads to advance the work laterally.

8. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, dies carried by said heads for perforating work therebetween and a pin carried by one of said heads entering a perforation in the work made by the dies in the previous cycle of said heads to advance the work laterally.

9. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, dies carried by said heads for operating on work therebetween and means for continuously advancing work between said heads, said means including means carried by one of said heads engaging a portion of the work operated on by the dies in a previous cycle of said heads.

10. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, and feeding means for feeding work between said heads in the direction of said lateral movement of said heads, said feeding means being inoperative during a portion of each cycle of movement of said heads while the work is being operated on by said heads.

11. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, and feeding means for feeding work between said heads in the direction of said lateral movement of said heads, said feeding means comprising means separate from said heads operable upon the work to feed the same during a portion only of each cycle of movement of said heads and means carried by at least one of said heads operable upon the work to feed the same during a portion of each cycle of movement of said heads.

12. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, feeding means for feeding work between said heads in the direction of said lateral movement of said heads, said feeding means comprising means separate from said heads operable upon the work to feed the same, means carried by at least one of said heads and operable upon the work to feed the same during a portion of each cycle of movement of said heads while said heads are close together and means for rendering inoperative said first mentioned means while said second mentioned means are operative.

13. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, feed rolls feeding work between said heads in the direction of said lateral movement of said heads and means rendering said feed rolls inoperative during a portion of each cycle of movement of said heads while said heads are close together.

14. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, feed rolls feeding work between said heads in the direction of said lateral movement of said heads during a portion only of each cycle of movement of said heads when said heads are relatively widely spaced and pin means carried by one of said heads engaging in the work to feed the same during a portion of each cycle of movement of said heads while said heads are close together.

15. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means disposed generally between said heads mounted separately from each thereof and oscillatable with said heads substantially in the direction of lateral movement of said heads and means for feeding work along said work guiding means.

16. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means disposed generally between said heads, means connected with at least one of said heads operating said work guiding means so that said work guiding means oscillates with said heads substantially in the direction of lateral movement of said heads and means carried by at least one of said heads for feeding work through said machine while the work is guided by said work guiding means.

17. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means disposed generally between said heads and oscillatable with said heads substantially in the direction of lateral movement of said heads and feed rolls for feeding work through said machine while the work is guided by said work guiding means.

18. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means disposed generally between said heads and oscillatable with said heads substantially in the direction of lateral movement of said heads and means for feeding work through said machine while the work is guided by said work guiding means, said feeding means including means operative during a portion of each cycle of movement of said heads and inoperative during a portion of each cycle of movement of said heads when the work is being acted on by said heads.

19. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means disposed generally between said heads and oscillatable with said heads substantially in the direction of lateral movement of said heads and feeding means for feeding work through said machine while the work is guided by said work guiding means, said feeding means comprising means separate from said heads operable upon the work to feed the same during a portion only of each cycle of movement of said heads and means carried by at least one of said heads operable upon the work to feed the same during a portion of each cycle of movement of said heads.

20. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and means for guiding work between said heads, said means being movable substantially in the direction of lateral movement of said heads when they are closest together and at substantially the same speed.

21. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and a stripper means for guiding work between said heads, said means being a stripper movable substantially in the direction of lateral movement of said heads when they are closest together and at substantially the same speed.

22. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and means for guiding work between said heads, said means being a combined work guide and stripper movable substantially in the direction of lateral movement of said heads when they are closest together and at substantially the same speed.

23. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, work controlling means substantially rectilinearly movable substantially in the direction of lateral movement of said heads when they are closest together and means connected with at least one of said heads operating said work controlling means.

24. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, work controlling means movable substantially in the direction of lateral movement of said heads when they are closest together and means extending between said heads and engaging said work controlling means operating said work controlling means.

25. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, work controlling means, means for guiding said work controlling means for substantially rectilinear movement substantially in the direction of lateral movement of said heads when they are closest together and means extending between said heads and slidably engaging said work controlling means whereby said work controlling means is caused to oscillate synchronously with operation of said heads.

26. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and counterweights carried by said shafts and positioned thereon so that when said heads are closest together said counterweights are approximately farthest apart.

27. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, said heads having means for attachment thereto of dies to operate on work positioned therebetween, and counterweights carried by said shafts, said counterweights being so constructed and arranged that the moments of inertia thereof about the axes of the respective shafts may be varied for different dies.

28. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, said heads having means for attachment thereto of dies to operate on work positioned therebetween, and counterweights carried by said shafts, said counterweights having material receiving cavities therein whereby through varying of the amount of fluid in said cavities the moments of inertia of the counterweights about the axes of the respective shafts may be varied for different dies.

29. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and counterweights carried by said shafts, said counterweights having fluid receiving cavities therein and said shafts having bores respectively communicating with said cavities and extending to the shaft ends through which fluid may be passed to or from the counterweights.

30. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, and means on said shafts for adjusting the throw of said eccentric means to adapt said heads to operate on material of different thicknesses fed in a predetermined path.

31. A forming machine comprising opposed parallel shafts, eccentric means thereon, cooperating forming heads operable by said eccentric means so that upon operation of said shafts said heads partake of motion toward and away from each other and when closest together move also laterally generally in the same direction, and eccentric adjusting means cooperating with said eccentric means for adjusting the throw of said eccentric means to adapt said heads to operate on material of different thicknesses fed in a predetermined path.

32. A forming machine comprising opposed parallel shafts, eccentric means thereon, cooperating forming heads operable by said eccentric means so that upon operation of said shafts said heads partake of motion toward and away from each other and when closest together move also laterally generally in the same direction, means for driving said shafts and supporting means for corresponding ends of said shafts, said supporting means being removable to permit removal of said heads from said shafts.

33. A forming machine comprising opposed parallel shafts, eccentric means thereon, cooperating forming heads operable by said eccentric means so that upon operation of said shafts said heads partake of motion toward and away from each other and when closest together move also laterally generally in the same direction, means for feeding work between said heads and supporting means for corresponding ends of said shafts and for said feeding means, said supporting means being removable to permit removal of said heads and said feeding means.

34. A forming machine in which stock fed through the machine is acted upon comprising a shaft mounted for rotation with one end exposed, a recess in said end of the shaft extending generally axially thereof, a feed roll having a portion entering said recess with the body of the feed roll projecting from the end of the shaft and means for maintaining said portion of the feed roll in place in said recess.

35. A forming machine in which stock fed through the machine is acted upon to form the same comprising a rotatable mounting member having a generally axial recess, a feed roll having an end portion entering said recess, and means connected with said mounting member and bearing against a portion of the feed roll holding the feed roll in place.

36. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work controlling means between and separate from said heads, means for guiding said work controlling means for substantially rectilinear movement substantially in said direction and means for oscillating said work controlling means synchronously with operation of said heads.

37. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work controlling means between and separate from said heads, means for guiding said work controlling means for movement substantially in said direction and means connected with at least one of said heads for oscillating said work controlling means synchronously with operation of said heads.

38. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work controlling means between and separate from said heads, means for guiding said work controlling means for movement substantially in said direction and driving means for the work controlling means connected with at least one of said heads and engaging the work controlling means to oscillate the same laterally with said heads.

39. A forming machine comprising opposed cooperating forming heads, means for imparting to said heads relative movement toward and away from each other and simultaneously with said relative movement oscillating movement laterally of the direction of said relative movement to enable said heads to move with moving work and act thereon during such movement, work controlling means between and separate from said heads, means for guiding said work controlling means for movement substantially in said lateral direction and means connected with at least one of said heads for oscillating said work controlling means synchronously in said lateral direction with movement of said heads.

40. A forming machine comprising opposed cooperating forming heads, means for imparting to said heads relative movement toward and away from each other and simultaneously with said relative movement oscillating movement laterally of the direction of said relative movement to enable said heads to move with moving work and act thereon during such movement, a work guide and stripper between and separate from said heads, means for guiding said work guide and stripper for movement substantially in said lateral direction and driving means for the work guide and stripper connected with at least one of said heads and engaging the work guide and stripper to oscillate the same laterally with said heads.

41. A forming machine comprising opposed cooperating forming heads, means for imparting to said heads relative movement toward and away from each other and simultaneously with said relative movement oscillating movement laterally of the direction of said relative movement to enable said heads to move with moving work and act thereon during such movement, work controlling means between and separate from said heads, means for guiding said work controlling means for movement substantially in said lateral direction and driving means for said work controlling means extending between said heads and slidably engaging said work controlling means to oscillate the same laterally with said heads.

42. A forming machine comprising opposed cooperating forming heads, dies on said heads for operating on work positioned therebetween, means for imparting to said heads relative movement toward and away from each other and simultaneously with said relative movement oscillating movement laterally of the direction of said relative movement to enable said heads to move with the work while the latter moves and said dies to act on the work during such movement and means separate from said dies carried by at least one of said heads for advancing work therebetween.

43. A forming machine comprising opposed cooperating forming heads, dies on said heads for operating on work positioned therebetween, means for imparting to said heads relative movement toward and away from each other and simultaneously with said relative movement oscillating movement laterally of the direction of said relative movement to enable said heads to move with the work while the latter moves and said dies to act on the work during such movement and means separate from said dies engaging the work during a portion only of each cycle of said heads to advance the work laterally.

44. A forming machine comprising opposed parallel shafts, eccentric means thereon, cooperating forming heads operable by said eccentric means so that upon rotation of said shafts said heads partake of motion toward and away from each other and when closest together move also laterally generally in the same direction, said movement of said heads tending to impart vibration to the forming machine and impose strains on said shafts, and counterweight means connected with at least one of said shafts for counteracting the tendency to vibrate the machine and the strains imposed on the shaft.

GUY O. CONNER.